A. H. HARRIS.
VEHICLE SPRING.
APPLICATION FILED JUNE 10, 1919.
1,333,976.
Patented Mar. 16, 1920.
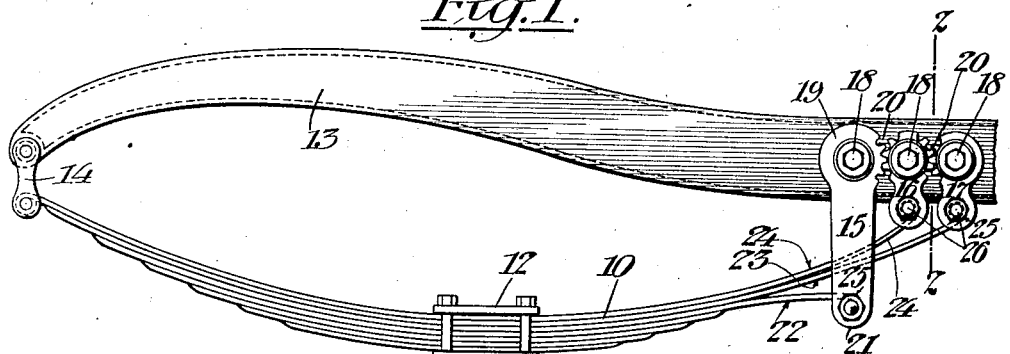
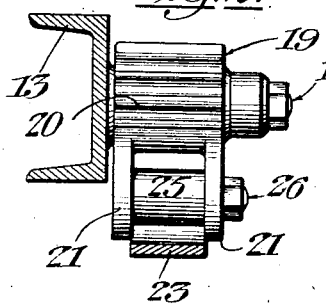
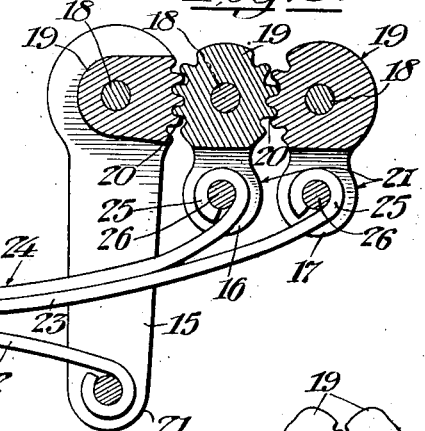
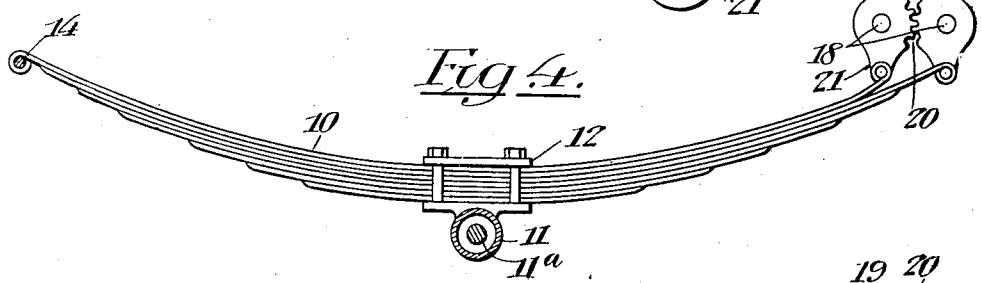
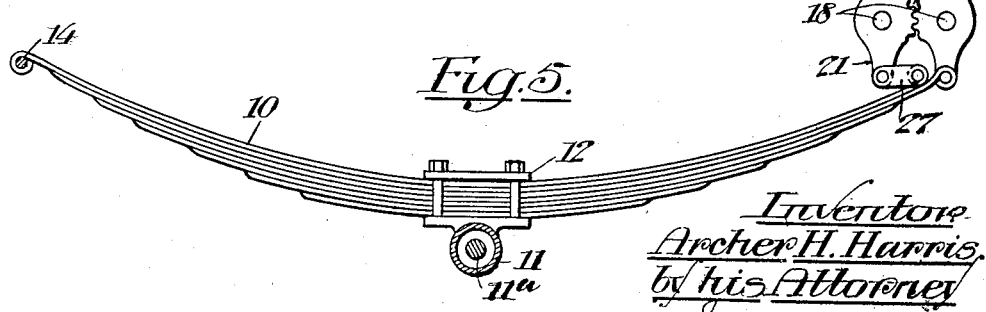
Inventor
Archer H. Harris,
by his Attorney
John F. Nolan

UNITED STATES PATENT OFFICE.

ARCHER H. HARRIS, OF BARBERTON, OHIO.

VEHICLE-SPRING.

1,333,976.      Specification of Letters Patent.     Patented Mar. 16, 1920.

Application filed June 10, 1919. Serial No. 303,154.

*To all whom it may concern:*

Be it known that I, ARCHER H. HARRIS, a citizen of the United States, and resident of Barberton, in the county of Summit and State of Ohio, have invented certain new and useful Improvements in Vehicle-Springs, of which the following is a specification.

This invention relates to vehicle springs, having reference, more especially, to laminated steel springs whereof the leaves are mounted and arranged to carry an equal proportion of the fore-and-aft thrust of the driving force.

The object of the invention is to provide a compensating connection for either end of a laminated steel spring, whereby the fore-and-aft sliding movements of the leaves of the spring in relation to each other (which is effected by the compression or the rebound of the spring) is permitted, and yet all liability of the fore or the aft movement of the spring as a whole is effectually obviated.

My invention, broadly considered, consists in the combination with the frame (or body) and axle elements of a vehicle, of a laminated steel spring connecting said elements, and a plurality of compensating members respectively connecting a like plurality of the leaves of the spring, at one end thereof, to one of said elements and comprising means whereby adjacent members are constrained to act in opposite directions to each other by the relative longitudinal movement of the leaves.

The invention, more specifically stated, comprises a construction in which the body of the spring is attached to the axle, or axle casing, of a vehicle; one end of the spring is shackled to the frame (or body) of the car, and two or more leaves of the spring are connected to combined hanger members which permit and insure the relative longitudinal movement of said leaves within limits, and yet prevent the unitary longitudinal movement of the spring.

The invention also comprises novel features of construction and combinations of parts which will be hereinafter described, and the scope of the invention then be defined in the appended claims.

In the drawings—

Figure 1 is a side elevation of a vehicle spring equipped with a compensating spring connection embodying one form of my invention, so much of the vehicle being shown as is necessary to illustrate the improvement. In this view the connection comprises a series of three combined hanger members.

Fig. 2 is a transverse vertical section, enlarged, through the structure as on the line 2—2 of Fig. 1.

Fig. 3 is a longitudinal vertical section through the compensating spring connection.

Fig. 4 is an elevation of the spring and a compensating connection therefor comprising two hanger members.

Fig. 5 is a similar view showing a slightly modified form of attachment between one of the leaves of the spring and a hanger member.

Referring to the drawings, 10 designates a laminated steel spring rigidly secured midway between its ends to the fixed axle casing 11 of a motor driven vehicle by means of a clamp connection 12. The axle which extends through the casing, is designated 11ª. One end of the spring is shackled to the frame 13 of the vehicle, as at 14, and two or more leaves or plates of the spring at the opposite end thereof are disposed in spaced relation to each other and are connected to the frame through the medium of my novel compensating device. This device in the form shown in Figs. 1, 2 and 3, comprises three oscillatory hanger members 15, 16, 17, which are conveniently pivoted in proximity to each other to the vehicle frame by studs 18 respectively, each member including a head portion 19 having peripheral gear teeth 20 and spaced depending arms or lugs 21, and being preferably, though not necessarily, an integral structure. The teeth of the adjacent members are in mesh with each other as shown, and hence the rotary movement of one is transmitted to the others, the movements of adjoining members being simultaneously in opposite directions to each other similarly to co-acting gear wheels. The spaced extending ends 22, 23, 24 of three superposed leaves of the spring are embraced by and pivotally secured to the arms or lugs of the respective hanger members. In the present instance each of the leaves terminates in an eye 25 through which extends a cross-pin 26 supported in and between the embracing lugs of the adjacent hanger member.

By the above described construction it will be seen that the fore-and-aft sliding movements of the leaves of the laminated spring, relatively to each other, resulting from the compression or the rebound of the spring, are freely permitted and insured by the counter-reflection of the correlated hanger members to which said leaves are connected, while at the same time fore or aft movement of the spring as a whole is prevented by the counteraction of the hanger members on the respective leaves connected thereto.

My novel compensating spring hanger, as it may be termed, effectually performs the function of a driving medium in connection with laminated springs wherein two or more leaves are required to carry an equal amount of the fore-and-aft thrust of the driving force as above mentioned.

In Figs. 4 and 5 I have shown the invention as applied to a laminated spring having only two of its leaves or plates connected to the hanger device, in which case one of the hanger members is omitted. A clevis or link connection between one of the leaves and its hanger member is illustrated as 27 in Fig. 5, the purpose of such connection being to minimize the bending effect on the spring in its upward or downward movement.

It is to be understood that my invention is not limited to the exact construction herein disclosed as the same may be modified within the principle of the invention and the scope of the appended claims; thus, for example, the compensating spring hanger, although it is herein illustrated as mounted on the frame of a motor-driven vehicle, may be attached to the axle of a vehicle equipped with the cantaliver type of spring.

I claim—

1. The combination, with a vehicle having frame and axle elements, of a laminated spring connecting said elements and a plurality of compensating members connecting a like number of the leaves of said spring, at one end thereof, to one of said elements, and including means whereby adjacent members are moved simultaneously in opposite directions to each other by the relative longitudinal movement of the said leaves.

2. The combination, with a vehicle having frame and axle elements, of a laminated spring connecting said elements and a plurality of compensating members connecting a like number of the leaves of said spring, at one end thereof, to one of said elements, said members including a series of intermeshing gears adapted to be counter-reflected by the relative longitudinal movement of the said leaves.

3. The combination, with a vehicle frame and axle, of a laminated spring having its body connected to the axle and one end connected to the frame, a plurality of compensating members connecting a like number of the leaves of said spring, at the opposite end thereof, to the frame, and including means whereby adjacent members are counter-reflected by the relative longitudinal movement of said leaves.

4. The combination, with a vehicle frame and axle, of a laminated spring having its body connected to the axle and one end connected to the frame, and a plurality of compensating members connecting a like number of the leaves of said spring, at one end thereof, to the frame, said members including a series of intermeshing gears adapted to be counter-reflected by the relative longitudinal movement of said leaves.

5. The combination, with a vehicle frame and axle, of a laminated spring having its body connected to the axle and one end connected to the frame, a compensating hanger connecting a plurality of the leaves of said spring, at one end thereof, to the frame, said hanger comprising a series of intermeshing gear members mounted to rotate on independent axes on the frame and having depending portions to which the said leaves respectively are hingedly attached.

Signed at Columbus, in the county of Franklin and State of Ohio this 4th day of June A. D. 1919.

ARCHER H. HARRIS.